July 3, 1928.
G. B. WADSWORTH
1,675,435
ELECTRICAL SWITCH
Filed March 24, 1921
3 Sheets-Sheet 1
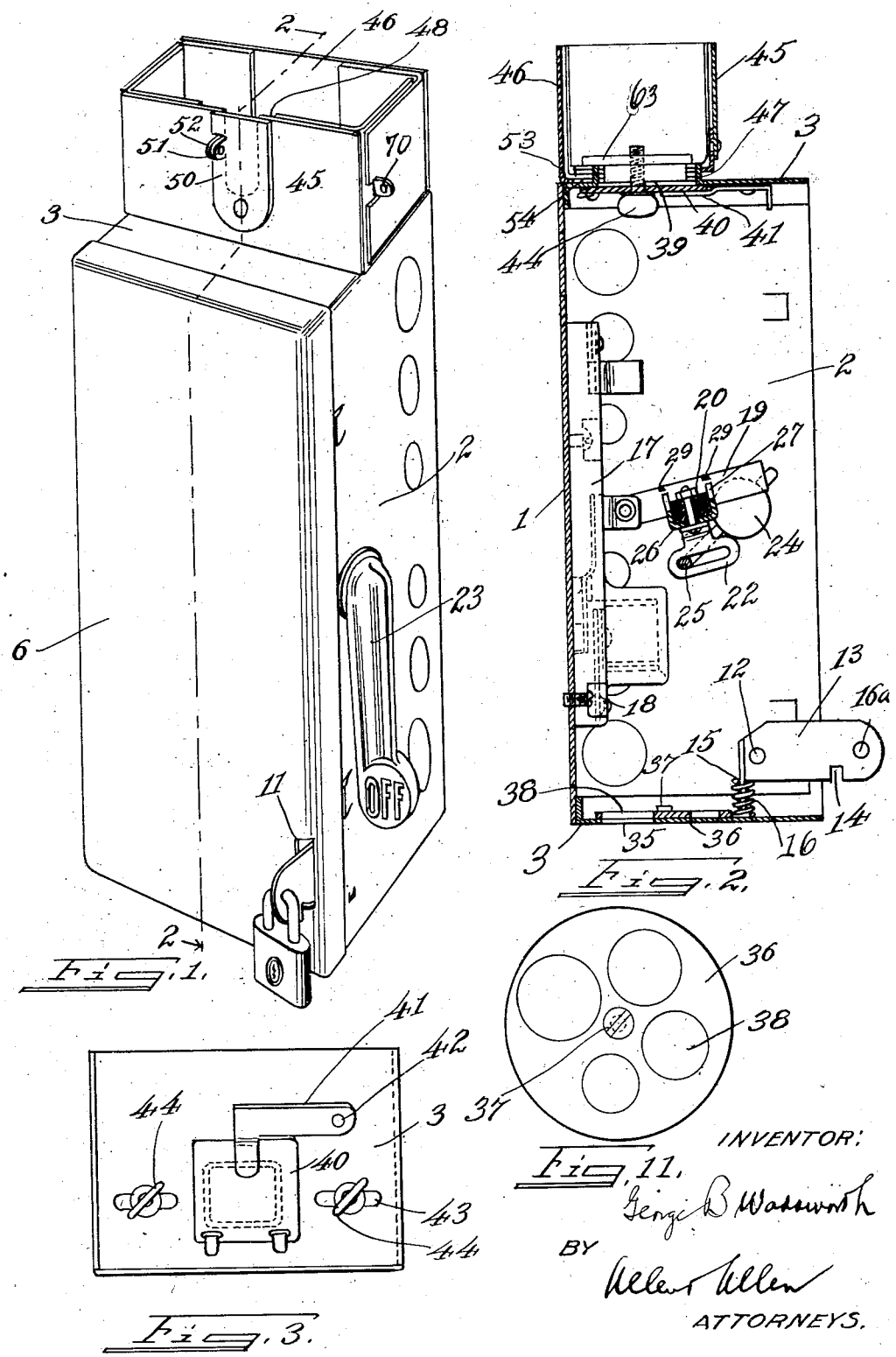

July 3, 1928.   1,675,435

G. B. WADSWORTH

ELECTRICAL SWITCH

Filed March 24, 1921   3 Sheets-Sheet 2

INVENTOR:
George B. Wadsworth

BY
ATTORNEYS.

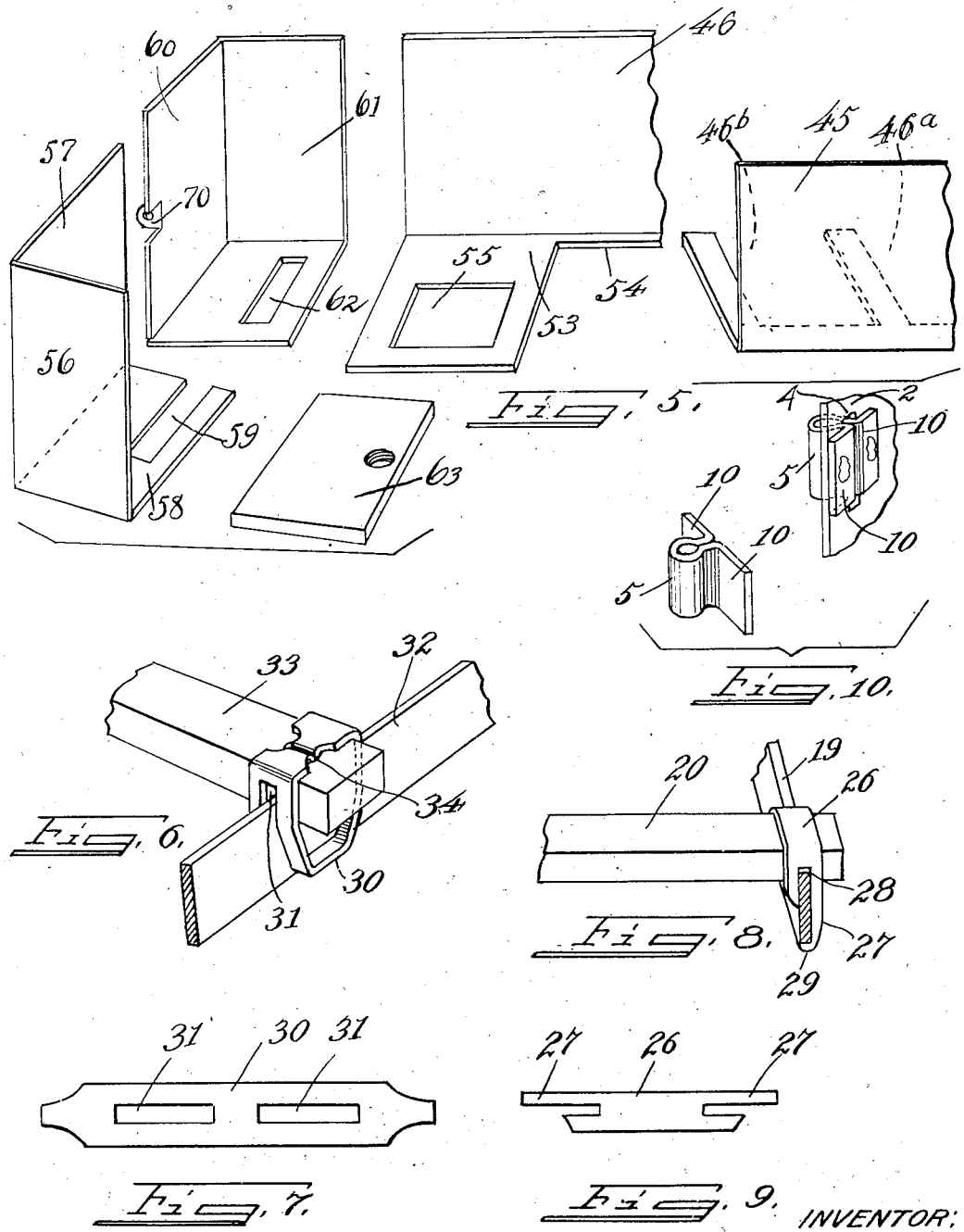

Patented July 3, 1928.

1,675,435

UNITED STATES PATENT OFFICE.

GEORGE B. WADSWORTH, OF COVINGTON, KENTUCKY, ASSIGNOR TO THE WADSWORTH ELECTRIC MANUFACTURING COMPANY, OF COVINGTON, KENTUCKY, A CORPORATION OF KENTUCKY.

ELECTRICAL SWITCH.

Application filed March 24, 1921. Serial No. 455,027.

My invention relates to electrical switches of the enclosed type, externally operated and particularly to meter adapters for such switches, although several of the improvements relate to switches in general.

A meter adapter is a housing or enclosure, enclosing the conductors between a switch cabinet and a meter terminal block, which, at the present time, is accomplished by means of a fitting formed especially of dimensions to conform to the dimensions of various types of meters as now commonly used by electric current selling companies and others. These adapters are constructed to conform to specifications prepared by the National Board of Underwriters Laboratories as well to municipal rulings and that of individuals. In some instances the requirements are that this enclosure consist of a back plate, sides and front, or in other words enclosing terminals on all sides, while in other instances, such devices are accepted for use only enclosing right and left side and front and not requiring anything other than the supporting base or wall at the back of the meter. There are two names applied to this particular fitting, a common trade name is "trim", but technically I believe the word "adapter" expresses the fitting.

One of the objects of my invention is the provision of a meter adapter for switch boxes, which is adjustable in size both transversely and longitudinally, so that it will accommodate all usual types of electric meter. So far as I am advised, the trim for housing meter terminal blocks in connection with electric switch boxes, while it may have been of "knock-down" construction in the past, has never been fully adjustable to take any style of meter.

Another object of my invention is the provision of a very simple, hinged-lid box for electrical switches, having a sturdy and economical structure, and certain novel hinge and latch devices.

Another object of my invention is to provide an adjustable conduit hole for switch boxes, taking the place of the usual "knockouts" in the majority of enclosed switch boxes of today.

I also provide, in connection with the meter adapter, for a simple means to close off the meter end of the box when the meter has been removed, and for the switch itself my invention includes a very economical method of securing the switch blades to the fibre bars.

These objects and other advantages to be noted below, I accomplish by that certain construction and arrangement of parts to be hereinafter more specifically pointed out and claimed.

In the drawings,

Figure 1 is a perspective view of the box with meter trim completely set up.

Figure 2 is a section on the line 2—2 of Figure 1.

Figure 3 is a detail plan view taken from the inside of the box, showing the clamp screws for the meter trim and the closing gate.

Figure 4:
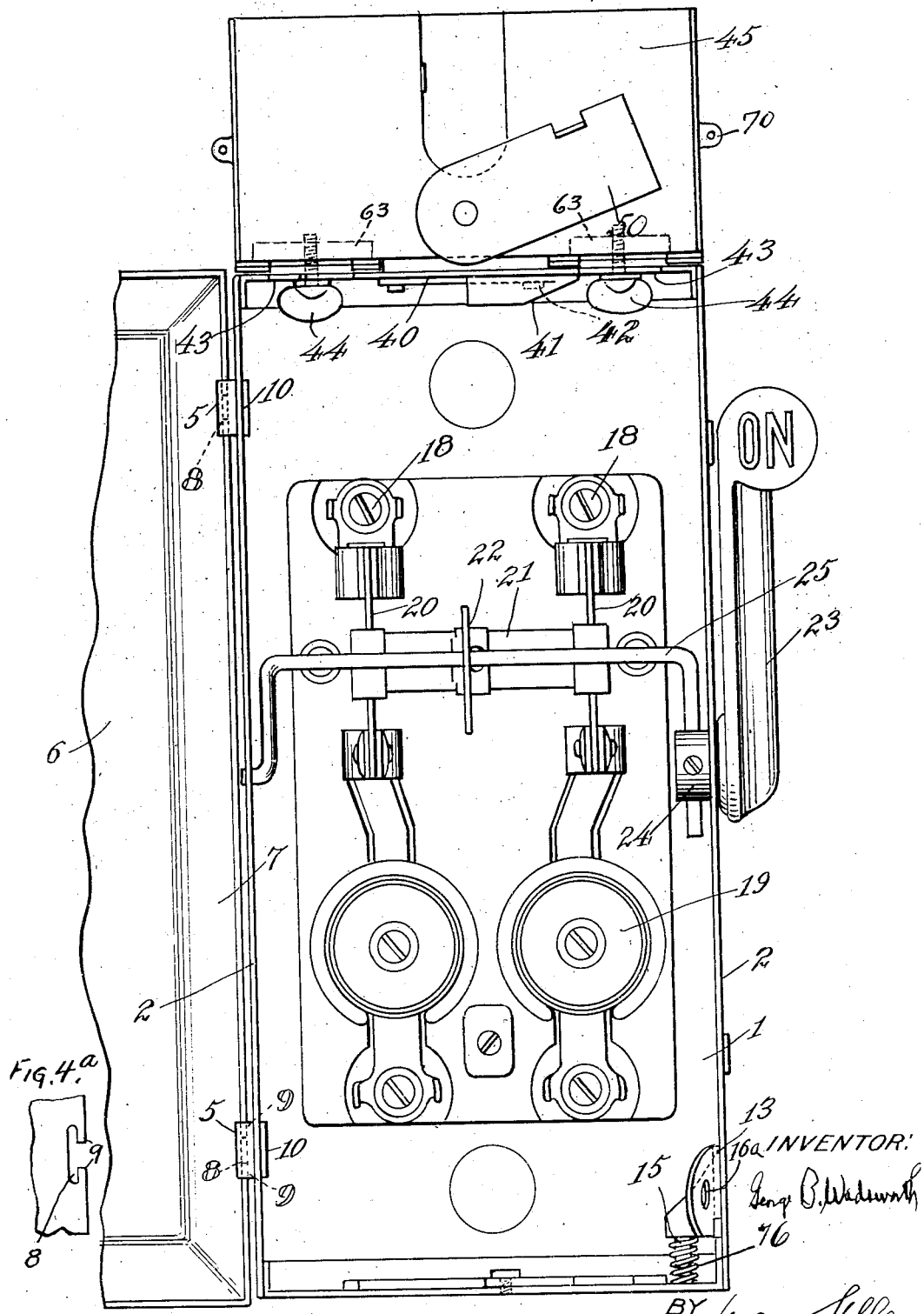
Figure 4 is a front elevation of the box with the door swung open.

Figure 4ª is a detail of the hinge slot.

Figure 5 is a detail perspective view of certain of the parts of the meter trim unassembled.

Figure 6 is a detail perspective showing one form of blade clamping clip.

Figure 7 is a plan view of the clip before being struck up.

Figure 8 is a detail perspective of another form of clamping clip.

Figure 9 is a plan view of the blank of this second form of clip.

Figure 10 is a view of the hinge device for the box lid, comprising two perspective views, one dismounted and one mounted.

Figure 11 shows the adjustable entrance plate.

Referring first to the container or box, it will be noted that I provide a sheet metal body having a base 1, sides 2, and ends 3. The one side is punctured with slots, within which the hinge devices are to be mounted. These hinge devices comprise small plates bent to form loops 5, and the lid 6 has a flange 7 which is cut with notches at the edge 8. The metal at the sides of the notches is formed into tongues 9, 9, which are inserted in the loops, after which the ends of the loop forming plates are inserted through the slots 4, 4, above noted. The operator then spreads the said ends as at 10, 10, so as to permanently secure the plates in position, thereby hinging the lid to the box.

The size of the lid is such that the flanges thereof overlie the sides of the box, so that when the lid is closed, all access to the interior of the box is cut off.

The opposite edge of the lid from the hinged edge is cut with a slot 11, which serves as the locking or latching slot for said lid. At the inside of the box, at the desired point, is pivotally mounted on a screw 12, a latch plate 13, having a notch 14 therein which engages the metal at the end of the slot 11, above noted, the entire plate 13 being adapted at its outer end to pass readily through the said slot when the lid is closed.

The plate 13 has a right angle extension, on which is mounted a post 15, and over the post is set a spring 16, which bears against the lower end of the box. This spring thus tends to force the plate 13 to a position of engagement with its notch 14 over the lower end of the lid slot, and the rounded nature of the protruding end of the plate 13 permits it to be forced up against spring pressure upon the closing of the lid.

The plate 13 will preferably have a hole 16ᵃ in its outer end, said hole being used for a seal or padlock, to prevent access to the box by unauthorized persons, and acts as an automatic latch, readily controlled by the operator, and serving as a sealing or locking member if desired by the owner.

Within the box is the desired form of cut-out, or switch, having a base 17 to which are secured the wire terminals 18 and fuses 19. The switch knife has blades 20 and a fibre connecting bar 21, said bar carrying the operating loop 22.

The handle 23, mounted externally of the box, has the stub shaft portion 24, which carries one end of a bail 25, which finds a bearing at its other end in the wall of the box. This bail passes through the loop 22, and the rocking thereof operates the switch knife under control of the operator.

I desire at this point to note the manner in which I secure the switch blades to the fibre, as this device is of very great saving in the manufacture of a switch box. Thus I provide one of two forms dependent upon the size, and weight of the parts. For a small switch the plate 26 is stamped out having bifurcated tongued ends 27, 27, one tongue on each end being longer than the other.

The fibre is slotted slightly to receive the blade, as at 28, and the plate or clip 26 is set over the free side of the fibre and bent over the blade, straddling it, with the bifurcated ends. The long tongue at each end is then bent over at 29, to engage a small notch formed for this purpose in the blade.

The entire operation of mounting the blade to the fibre can be done in a press with great rapidity, as compared to the labor of securing the parts together by screws.

For larger work, where it is desirable that heavier construction be employed, I provide the plates 30 which have slots 31, 31, therein, through which the switch blade 32 is passed, while the fibre 33 is grooved as before to seat the blade, but in this instance has a hole 34 formed therein. The ends of the piece 30 are brought around the top of the fibre and forced down into the hole therein, this also being a matter of press work, while at the same time excessively strong and durable.

In connection with the entrance orifice in the base of the box, or in such other wall thereof, as may be desirable to the designer, I provide an adjustable element. Thus, as shown with reference to the orifice 35 in the lower end of the box, the plate 36 is provided, which said plate is rotatably mounted on a screw 37 in the box end. This plate has a series of holes 38 therein, same being of graduated sizes, so that the result of revolving the disk around will be to bring the desired size of hole in registry with the orifice 35, thereby accommodating the desired size of conduit.

Referring now to the adjustable meter trim, it will be noted that same is mounted at the upper end of the box, although, of course, either end would serve. In the selected end, there is formed an outlet orifice 39, and hinged to the said box end is a door 40, which may be swung into position to close the orifice. A tongue 41 is pivoted to the inside of said box end, as at 42, and may be moved into position to maintain the door in closed position, or swung away to permit it to fall or be thrust out of the way of wires passing to the meter.

There are also two elongated slots 43 in the box end, to accommodate the thumb screws 44, 44, which control the position of the meter trim.

It will be noted that the meter trim has a front piece 45, and a back piece 46. The front piece is turned under at an angle and is slotted at 46ᵃ to fit over the flange 47 turned up around the sides of the orifice therein. The upstanding portion of this piece 45 has a cut-out 48 therein, which is closed by a door 50, which is loosely riveted at the base of the cut-out and has a small lug turned up as at 51, to match a like lug 52 on the piece 45, thereby accommodating a seal for revealing improper tampering with the meter or its terminals.

The back piece 46 is also turned under as at 53, and there cut-out as at 54 to straddle the flange of the box end orifice, and also cut-out at both ends as at 55, to straddle the clamping screws, as will be noted. This back piece can be adjusted in its position to expand the width of the completed trim or adapter. The front 45 has cut-outs 46ᵇ alike to the portions 55 except that the ends of the cut-outs are open instead of closed.

The ends of the device consist of pieces which telescope into each other. One of the pieces of each pair has a side wall 57 and a front wall 56. The base 58 of these pieces, which make up the two front corners, is slotted at 59 to ride over the clamping screws. The two rear side pieces, 60, 61, making up the rear corners, have side walls 60, rear walls 61 and closed slots 62, which likewise engage over the clamping screws.

The two slots in the box extend transversely of the direction of the slots in the end pieces of the meter adapted structure, and the screws 44 extend up through the slots in the front, back and side pieces, where they engage clamp plates 63, which are set over the parts of the adapter after they are assembled.

It may thus be seen that after the box has been set up and the meter is to be mounted, the terminal block thereof may be placed over the box, the clamp screws loosened and the plates spread or thrust in, until the right size adapter is formed to house the terminal block. This is accomplished by the front, back and side plates sliding on their own clearance over the clamping screws and the clamping screws sliding in their slots in the box.

The various pieces are arranged so that they will overlap each other in all normal or practical positions of housing any known size of meter terminal block. The tightening down of the screws will clamp the various pieces firmly in place.

If desired, the whole device may be shifted so as to bring the front part to the back, upon doing which, it will be noted that force applied to the adapter will not be successful in removing any parts thereof by overcoming the clamping action. The box is set against a wall so that the rear parts cannot be pulled backward and the front parts cannot be pulled forward and removed because they would then have closed slots over the clamping screws. As may be noted, the back piece might be omitted altogether where the box is mounted against a wall.

Various modifications of the expansible housing for meter terminal blocks may be devised, and I have merely described one form which occurs to me and which is to be recommended for simplicity of parts and an easy method of expansion both transversely and longitudinally. Furthermore it is quite important that the clamping or locking device for the adapter should be within the box, so that when the box is locked, no one can tamper with the adapter.

A rectangular form of adapter also recommends itself to me, because of its similarity to the usual type of meter terminal block of today.

As shown in the drawings, small lugs 70 of metal may be turned out from the parts of the adapter, where desired, to receive a wire, which may then be sealed at its ends, to prevent tampering with the device.

Having thus described my invention, what I claim as new and desire to secure by Letters Patent, is:—

1. A sealable electrical appliance housing having an aperture at one end through which conductors may be passed and having adjustable means arranged about the aperture whereby any one of a plurality of sizes of meter terminal chambers may be substantially inclosed on at least three sides, and means operable only from within the housing for securing the adjustable means in selected positions.

2. A sealable electrical appliance housing having an aperture at one end through which conductors may be passed and having adjustable means arranged about the aperture whereby any one of a plurality of sizes of meter terminal chambers may be substantially inclosed on at least three sides, and means operable only from within the housing for securing the adjustable means in selected positions, said means comprising clamping plates engaging said adjustable means, and bolts screwed into the plates and passing through a portion of the housing around said aperture.

GEORGE B. WADSWORTH.